(12) United States Patent
Benisty et al.

(10) Patent No.: US 10,459,844 B2
(45) Date of Patent: Oct. 29, 2019

(54) MANAGING FLASH MEMORY READ OPERATIONS

(71) Applicant: Western Digital Technologies, Inc., San Jose, CA (US)

(72) Inventors: Shay Benisty, Beer Sheva (IL); Ariel Navon, Revava (IL); Alon Marcu, Tel-Mond (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 83 days.

(21) Appl. No.: 15/851,706

(22) Filed: Dec. 21, 2017

(65) Prior Publication Data

US 2019/0196972 A1    Jun. 27, 2019

(51) Int. Cl.

| G06F 12/00 | (2006.01) |
|---|---|
| G06F 12/0879 | (2016.01) |
| G06F 12/02 | (2006.01) |
| G06F 3/06 | (2006.01) |
| G06N 20/00 | (2019.01) |

(52) U.S. Cl.
CPC ........ *G06F 12/0879* (2013.01); *G06F 3/0611* (2013.01); *G06F 3/0656* (2013.01); *G06F 3/0659* (2013.01); *G06F 3/0679* (2013.01); *G06F 12/0246* (2013.01); *G06F 2212/1024* (2013.01); *G06F 2212/2022* (2013.01); *G06N 20/00* (2019.01)

(58) Field of Classification Search
CPC ............. G06F 12/0879; G06F 12/0246; G06F 3/0611; G06F 3/0656; G06F 3/0659; G06F 3/0679; G06F 2212/1024; G06F 2212/2022; G06N 20/00
See application file for complete search history.

(56) References Cited

U.S. PATENT DOCUMENTS

| 2014/0223073 A1 | 8/2014 | Benisty et al. |
| 2016/0224255 A1* | 8/2016 | Park .................... G06F 3/0611 |

* cited by examiner

*Primary Examiner* — Shawn X Gu
(74) *Attorney, Agent, or Firm* — Patterson & Sheridan, LLP; Steven H. Versteeg (57) ABSTRACT

Embodiments of the present disclosure generally relate to a storage device and method of managing flash memory read operations of a storage device. In one embodiment, a method of retrieving information stored in a storage device comprises determining a timing of a next host read command for a flash memory die. If there is a storage device initiated read request for the flash memory die is determined. In response to an identification of the storage device initiated read request, a random cache read operation is initiated with the storage device initiated read request bound with the next host read command.

22 Claims, 7 Drawing Sheets

MANAGING FLASH MEMORY READ OPERATIONS

BACKGROUND OF THE DISCLOSURE

Field of the Disclosure

Embodiments of the present disclosure generally relate to a storage device and method of managing flash memory read operations of a storage device.

Description of the Related Art

Non-volatile memory devices, such as flash memory devices, have been widely adopted for use in the storage of data. To retrieve data stored in flash memory devices, a host issues a read command to a flash controller of the flash memory device. The flash controller implements a read operation of the flash memory to provide the data to the host.

Figure 1:
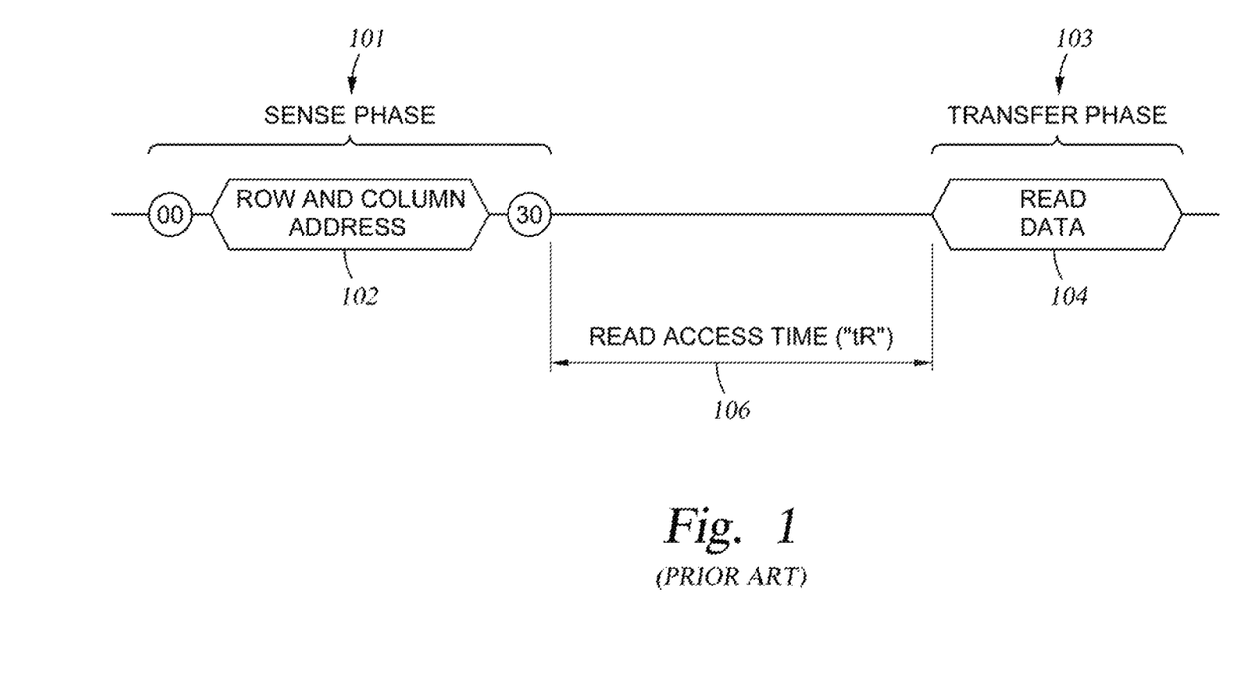
FIG. 1 is a schematic illustration of one example of a timing diagram of input/output signals of a flash interface between a flash controller and a flash memory for a page read operation.

One type of read operation of flash memory is a page read operation. FIG. 1 is a schematic illustration of one example of a timing diagram of input/output signals of a flash interface between a flash controller and a flash memory for a page read operation. A page read operation includes a sense phase 101 and a transfer phase 103 for each read. Sense phase 101 includes an identification of the row and column address 102 by the flash controller. Sense phase 101 starts by driving command 00 to the flash interface and ends by driving command 30 to the flash interface. The flash controller waits a read access time (tR) 106, the time between when the row and column address 102 are known until the data is actually read from the flash memory to internal switches or to internal buffers of the flash memory device. A typical read access time tR is 50 microseconds. Transfer phase 103 is the transfer of the read data 104 to the flash controller. One problem with a page read operation is the reduced performance of the flash memory device since the flash memory device must wait the read access time tR to access the data.

Another type of read operation of flash memory is a random cache read operation. A random cache reach operation interleaves host read access commands using a cache buffer to hide the read access time tR. One problem with prior flash memory devices is poor utilization of a random cache read operation by the memory device controller due to the random rate of commands issued by the host to the memory device controller.

Therefore, there is a need for an improved flash memory device and improvement method of accessing data from a flash memory device.

SUMMARY OF THE DISCLOSURE

Embodiments of the present disclosure generally relate to a storage device and method of retrieving information stored in a storage device by using a random cache read operation or a burst read operation.

In one embodiment, a method of retrieving information stored in a storage device comprises determining a timing of a next host read command for a flash memory die. If there is a storage device initiated read request for the flash memory die is determined. In response to an identification of the storage device initiated read request, a random cache read operation is initiated with the storage device initiated read request bound with the next host read command.

In another embodiment, a method of retrieving information stored in a storage device with an open cache read operation for a flash memory die comprises determining a timing of completion of any outstanding read requests within the open cache read operation. A timing of a next host read command for the flash memory die is determined. The next host read command is executed.

In one embodiment, a storage device comprises a plurality of flash memory dies. The storage device further comprises a controller including a host read command analyzer. A flash interface couples the controller and the plurality of flash memory dies. The controller is operable to determine a timing of a next host read command to a particular flash memory die of the plurality of flash memories dies and to use the timing of the next host read command of the particular flash memory die.

In another embodiment, a storage device comprises a flash memory die and a controller means. A flash interface couples the controller means and the flash memory die. The controller means is operable to manage random cache read sequences and to incorporate next host read commands and storage device initiated read requests into the random cache read sequences.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

Embodiments of the present disclosure generally relate to a storage device and method of managing flash memory read operations of a storage device. In certain embodiment, a storage device and method of retrieving information stored in a storage device include using a random cache read operation or a burst read operation. In certain embodiments, a plurality of read commands/requests are bound together in a single random cache read operation or a burst read operation.

Figure 2:
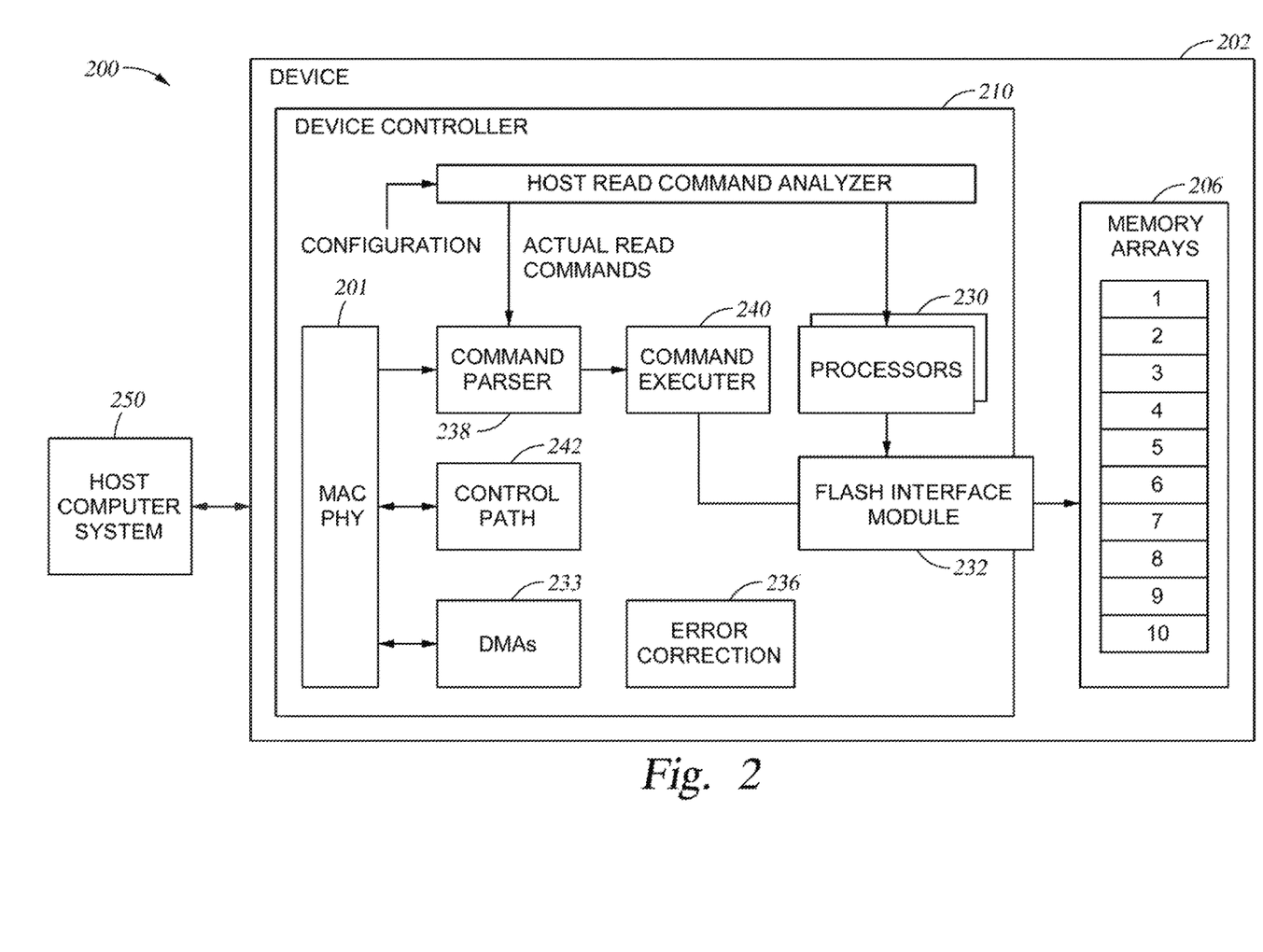
FIG. 2 is a schematic illustration of one embodiment of a system including an initiator or host and a storage device, such as a solid state drive (SSD), for host.

FIG. 2 is a schematic illustration of one embodiment of a system 200 including an initiator or host 250 and a storage device 202, such as a solid state drive (SSD), for host 250. Host 250 may utilize a flash memory 206 included in storage device 202 to write and to read data, such as for long term memory storage. Storage device 202 may be an internal storage drive, such as a notebook hard drive or a desktop hard drive. Storage device 202 may be a removable mass storage device, such as, but not limited to, a handheld, removable memory device, such as a memory card (e.g., a secure digital (SD) card, a micro secure digital (micro-SD) card, or a multimedia card (MMC)) or a universal serial bus (USB) device. Storage device 202 may take the form of an embedded mass storage device, such as an eSD/eMMC embedded flash drive, embedded in host 250. Storage device 202 may also be any other type of internal storage device, removable storage device, embedded storage device, external storage device, or network storage device.

Host 250 may include a wide range of devices, such as computer servers, network attached storage (NAS) units, desktop computers, notebook (i.e., laptop) computers, tablet computers (i.e., "smart" pad), set-top boxes, telephone handsets (i.e., "smart" phones), televisions, cameras, display devices, digital media players, video gaming consoles, video streaming devices, and automotive applications (i.e., mapping, autonomous driving). In certain embodiments, host 250 includes any device having a processing unit or any form of hardware capable of processing data, including a general purpose processing unit, dedicated hardware (such as an application specific integrated circuit (ASIC)), configurable hardware such as a field programmable gate array (FPGA), or any other form of processing unit configured by software instructions, microcode, or firmware.

Host 250 includes a central processing unit connected to a host memory space, such as DRAM or other main memories. An application program may be stored to memory space for execution by components of host 250. Host 250 includes a bus which interacts with a host interface 201, which may include mac and phy components, of storage device 202 for ingress and for egress of communications between host 250 and storage device 202.

Bus of host 250 and host interface 201 operate under a communication protocol. Suitable communication protocols include a Peripheral Component Interface Express (PCIe) serial communication protocol ethernet, serial attached SCSI (SAS), serial AT attachment (SATA), any protocol related to remote direct memory access (RDMA) such as Infiniband, iWARP, or RDMA over Converged Ethernet (RoCE), and other suitable communication protocols. Storage device 202 may also be connected to host 250 through a switch or a bridge.

Flash memory 206 of storage device 202 may be configured for long-term storage of information as non-volatile memory space and retains information after power on/off cycles. Flash memory 206 may include one or more of memory arrays, such as one of more dies of flash memory configured in a NAND configuration or a NOR configuration. For example, as shown in FIG. 2, flash memory 206 may comprise ten flash dies although any number of dies is possible. In other embodiments, storage device 202 may include other types of non-volatile memory, such as phase change memories, ReRAM memories, MRAM memories, magnetic media (including shingle magnetic recording), optical disks, floppy disks, electrically programmable read only memories (EPROM), electrically erasable programmable read only memories (EEPROM), and other solid-state memories.

Storage device 202 includes a controller 210 which manages operations of storage device 202, such as writes to and reads from flash memory 206. Controller 210 may include one or more processors 230, which may be multi-core processors. Processor 230 manages the components of storage device 202. Controller 210 includes a host read command analyzer 220.

Storage device 202 may also include other components, such as flash interface module 232, a direct memory access DMA module 233, an error correction module 236, a command parser 238, a command executer 240, and a control path 242. Flash interface module 232 controls and accesses the memory arrays. DMA module 233 executes data transfers between host 250 and storage device 202 without involvement from CPU. Error correction module 236 corrects the data stored in flash memory 206 from the memory arrays. Command parser 238 fetches and parses the commands from Host 250 and queues them internally. Command executer 240 arbitrates and executes the commands.

Controller 210 may operate under NVM Express (NVMe) driver protocol, but other protocols are applicable. Controller may also include volatile memory or cache buffers for short-term storage or temporary memory during operation of storage device 202. Cache buffers do not retain stored data if powered off. Examples of volatile memories include dynamic random access memories (DRAM), static random access memories (SRAM), and other forms of volatile memories.

Controller 210 executes computer-readable program code (e.g., software or firmware) executable instructions (herein referred to as "instructions"). The instructions may be executed by various components of controller 210, such as processor 230, logic gates, switches, application specific integrated circuits (ASICs), programmable logic controllers, embedded microcontrollers, and other components of controller 210.

The instructions are stored in a non-transitory computer readable storage medium. In certain embodiments, the instructions are stored in a non-transitory computer readable storage medium of storage device 202, such as in a read-only memory or flash memory 206. Instructions stored in storage device 202 may be executed without added input or directions from host 250. In other embodiments, the instructions are transmitted from host 250. Controller 210 is configured with hardware and instructions to perform the various functions described herein and shown in the figures.

Figure 3:
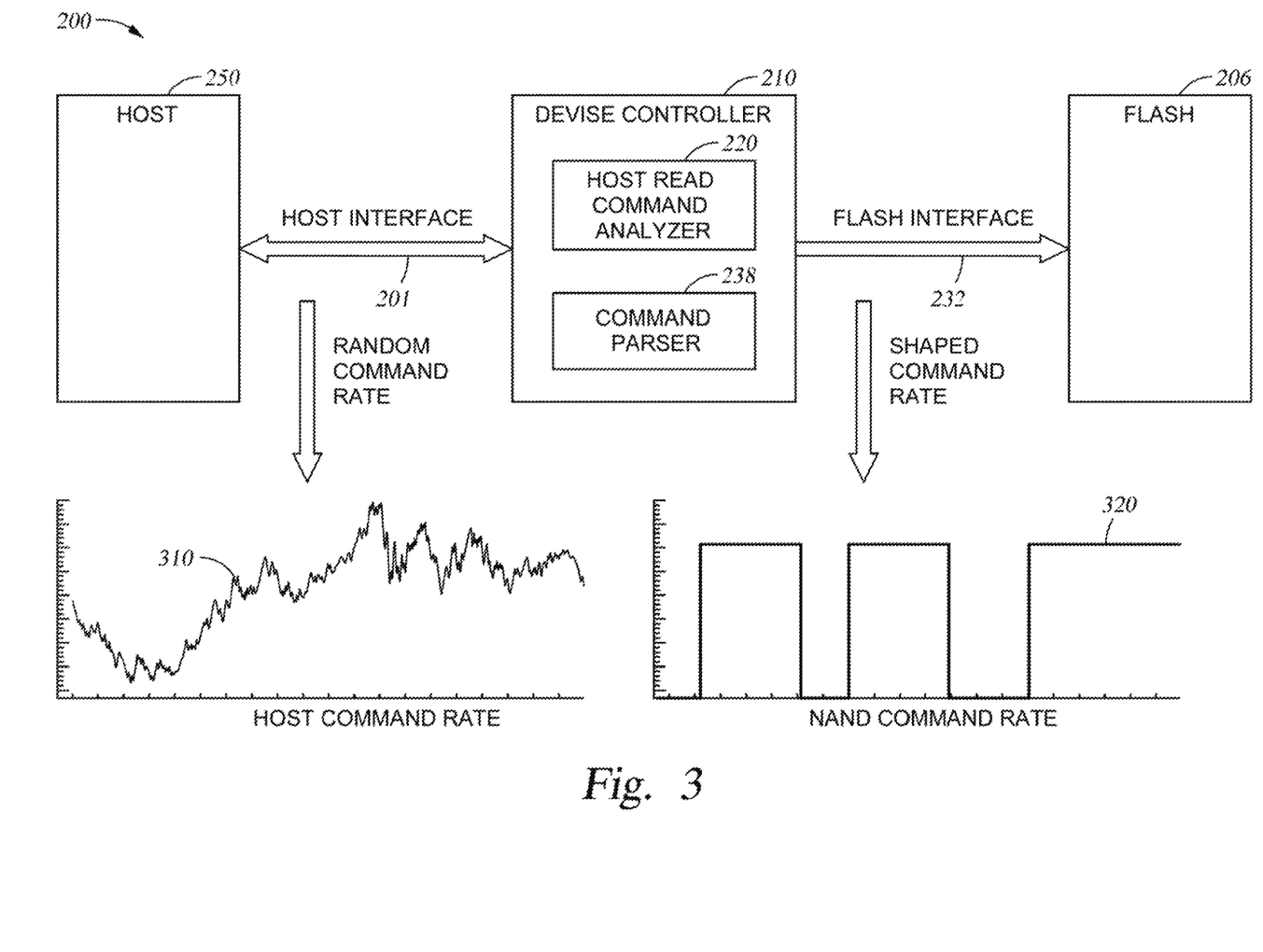
FIG. 3 is a schematic illustration of a device controller of a storage device receiving read commands issued from a host and performing read operations to a flash memory in response to the received host read commands.

FIG. 3 is a schematic illustration of device controller 210 of storage device 202 receiving read commands issued from Host 250 and performing read operations to flash memory 206 in response to the received host read commands. Device controller 210 is described in reference to system 200 of FIG. 2, but other systems may be applicable.

The received read commands issued from Host 250 typically occur at a random read command rate 310 to device controller 210. In certain embodiments, device controller 210 utilizes host read command analyzer 220 to determine, predict, or estimate one or more attributes of a next read command to be issued by host 250 in the future. Controller 210 uses the determination of one or more attributes of a next host read command to bind or to aggregate a plurality of read requests into a single read operation to form a shaped read command rate 320 to flash memory 206. For example, one or more read requests may be bound with the next host read command by controller 210 in a random cache read operation or any appropriate burst operation. Shaped read command rate 320 may increase the performance and the transfer of read data from flash memory 206 to host 250 by increasing the efficiency of input/output (i.e., increased pipeline efficiency) through flash interface module 232. In certain embodiments, instead of executing host read commands upon receipt by controller 210, controller 210 determines or estimates a timing of a next host read command to bind a plurality of read requests into a burst read operation to avoid a read access time rT or latency from a page read operation.

Host read command analyzer 220 may use the previous issued host read commands to determine or to estimate one or more attributes of a next host read command. For example, host read command analyzer 220 uses one or more attributes of actual host read commands, such as but not limited to the following inputs: arrival time of host read command, command read size, logical block address (LBA) range accessed, flash memory die(s) accessed, and/or stream ID.

The one or more attributes of a next host read command determined by host read command analyzer 220 includes, but are not limited to the following outputs: a timing of a next host read command, command read size, flash memory die(s) to be accessed, and/or stream ID. A timing of a next host read command may be any timing. For example, the timing may be a specific time, such as the next host read command is predicted to be received in 50 microseconds, or may be a range of times, such as the next host read command is predicted to be received between 100 microseconds or 200 microseconds or such as the next host read command is predicted to be received in 100 microseconds or less. A command read size may be any size. For example, the command size of a read data may a specific size or may be a range of sizes, such as less than 1 MB.

In certain embodiments, host read command analyzer 220 may receive updates from command parser 238 on host read command actually received. Host read command analyzer 220 may use the updates from command parser 238 to fine tune and increase the accuracy of subsequent determinations, estimation, or predictions of another next host read command or a second host read command. For example, host read command analyzer 220 may compare attributes of actually received next host read commands with the predicted attributes of the host read commands.

In certain embodiments, host read command analyzer 220 may include machine learning, such as regression, classification, mixture of Gaussian (MOG), support vector machine (SVM), Hidden Markov Model (HMM), neural network, reinforcement learning, or other types of machine learning. Machine learning of host read command analyzer 220 may include training based on historic received host read command or updates on recently received host read commands.

For example, host read command analyzer 220 may utilize classification model machine learning to determine or estimate that a next host read command will fall into a defined classification. For example, TABLE 1 shows four classifications of a determined or estimated timing range and a size range of a next host read command estimated to be received in time t with a command size s.

TABLE 1

| Class | Predicated Host Read Command Arrival Time (t) | Command Size (s) |
|---|---|---|
| 1 | $0 \leq t \leq T_1$ | $s \leq S_1$ |
| 2 | $T_1 < t$ | $s \leq S_1$ |
| 3 | $0 \leq t \leq T_1$ | $S_1 < s$ |
| 4 | $T_1 < t$ | $S_1 < s$ |

Host read command analyzer 220 may utilize machine learning to configure values $T_1$ and $S_1$ or other model parameters in off-line qualification or dynamically according to a specific user behavior and/or specific flash memory die behavior.

In other embodiments, host read command analyzer 220 may use targeted performance-gain objectives to determine one or more attributes of a next host read command.

Controller 210 may also use one or more attributes of a next host read command determined by host read command analyzer 220 to terminate a random cached read operation or a burst operation. For example, controller 210 may terminate a burst operation since there are no pending read requests. In another example, controller 210 may continue a burst operation since a next host read command is estimated to be received soon. In still another example, controller 210 may terminate a burst operation based upon a determination of a next host read command so that that next host read command may be included in a separate burst operation.

Controller 210 utilizes host read command analyzer 220 to manage the workload across flash interface module 232. In certain embodiments, controller 210 may use host read command analyzer 220 to determine a next host read command to initiate a burst read operation. In certain embodiments, controller 210 may use host read command analyzer 220 to determine a next host read command to terminate a burst read operation. In certain embodiments, controller 210 may use host read command analyzer 220 to determine a first next host read command to initiate a burst read operation and to determine a second next host read command to terminate the burst read operation.

Figure 4:
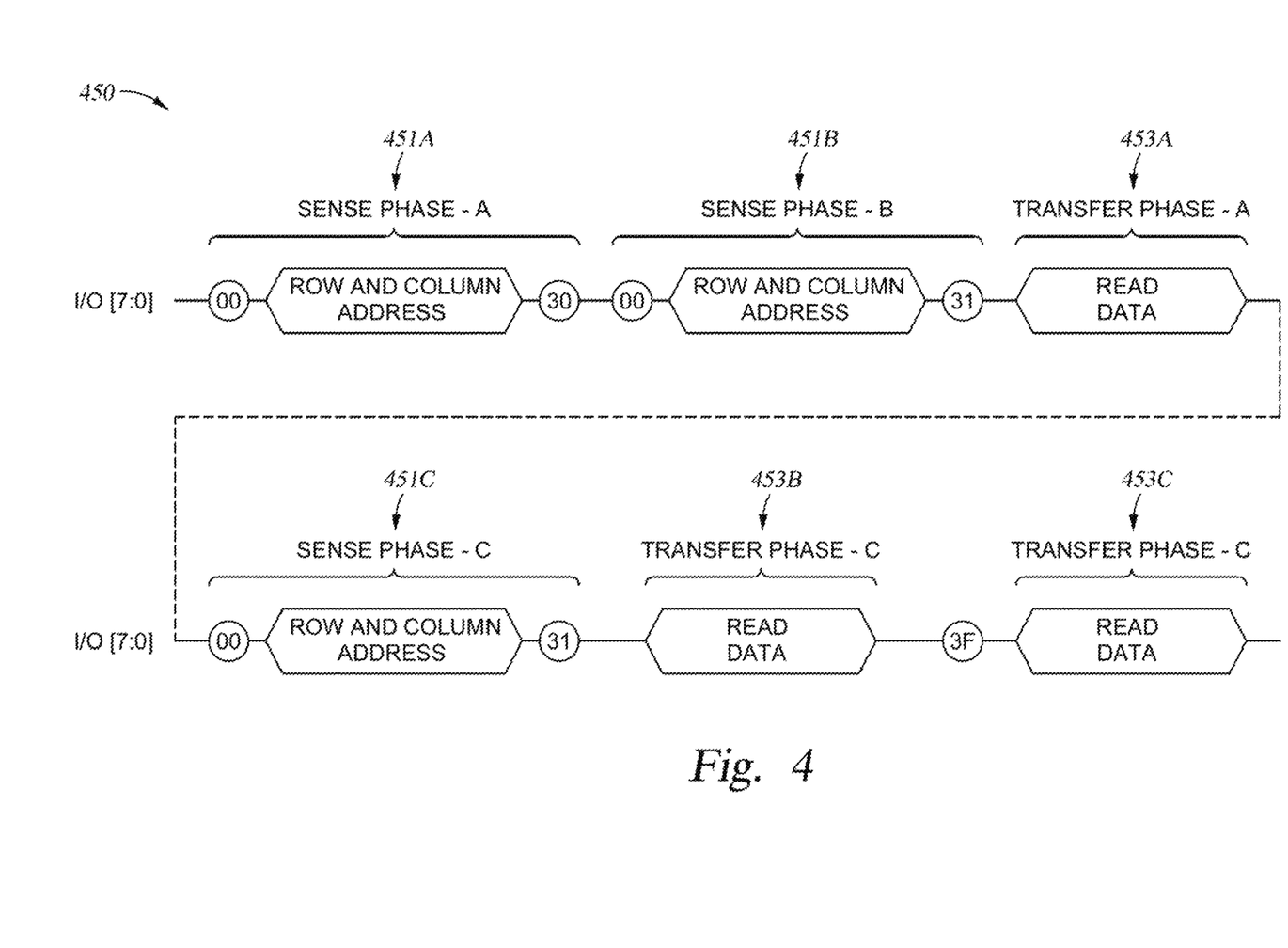
FIG. 4 is a schematic illustration of one embodiment of a timing diagram of input/output signals of a flash interface module between controller and a die of flash memory for a random cache read operation.

FIG. 4 is a schematic illustration of one embodiment of a timing diagram of input/output signals of flash interface module 232 between controller 210 and a die of flash memory 206 for a random cache read operation 450. Random cache read operation 450 is described in reference to storage device 202 of FIG. 1, but other storage devices are applicable. Random cache read operation 450 uses a cache buffer of storage device 202 to increase performance.

In the example of FIG. 4, three read operations (A, B, C) are shown bounded together in a single burst operation. Each read operation includes a sense phase 451 and a transfer phase 453. Sense phase 451A for read operation A occurs followed by sense phase 451B for read operation B. The read access time tR of read operation A occurs in part during sense phase 451B of read operation B since the sense time of the sense phase is typically shorter than read access time tR. Following sense phase 451B of read operation B, transfer phase 453A of read operation A occurs.

The read access time tR of read operation B occurs in part during transfer phase 453A of read operation A and/or or sense phase 451 of read operation C since the transfer time of the transfer phase is typically shorter than read access time tR. After sense phase 451C of read operation C, transfer phase 453B of read operation B occurs. Driving command 3F on flash interface module 232 terminates the current random cache read sequence and flash memory 206 transfers the last page associated with this sequence at transfer phase 453C.

As shown in FIG. 4, sense phases 451 and transfer phases 453 are interleaved and the read access time tR of one read operation occurs during a sense phase or a transfer phase of another read operation shortening the overall time to complete the multiple read requests in a single random cache read operation 450.

Figure 5A:
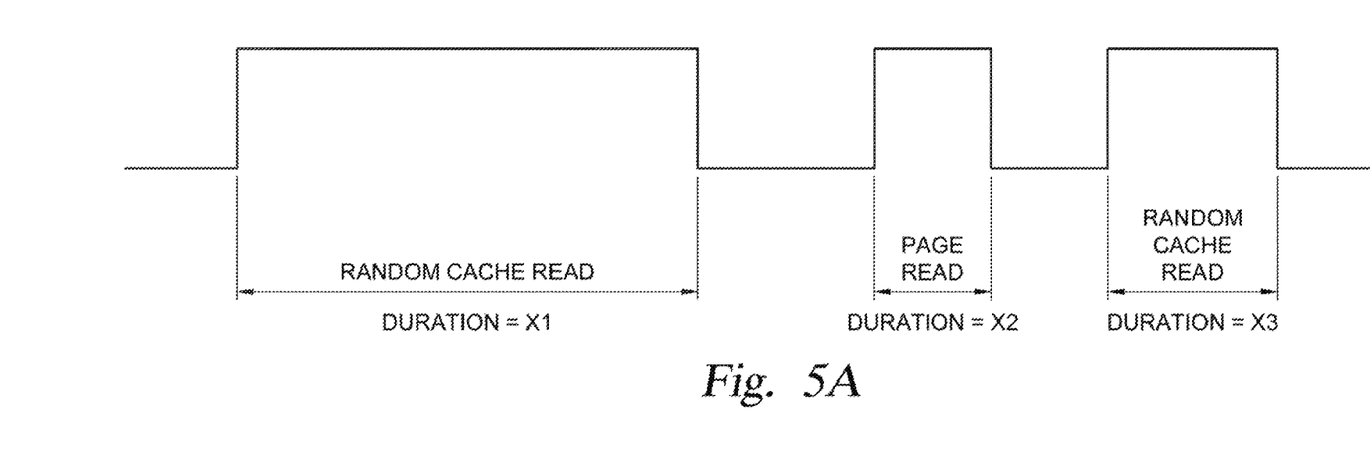
FIG. 5A is a schematic illustration of a duration to complete three separate read operations of a particular flash memory die.
Figure 5B:
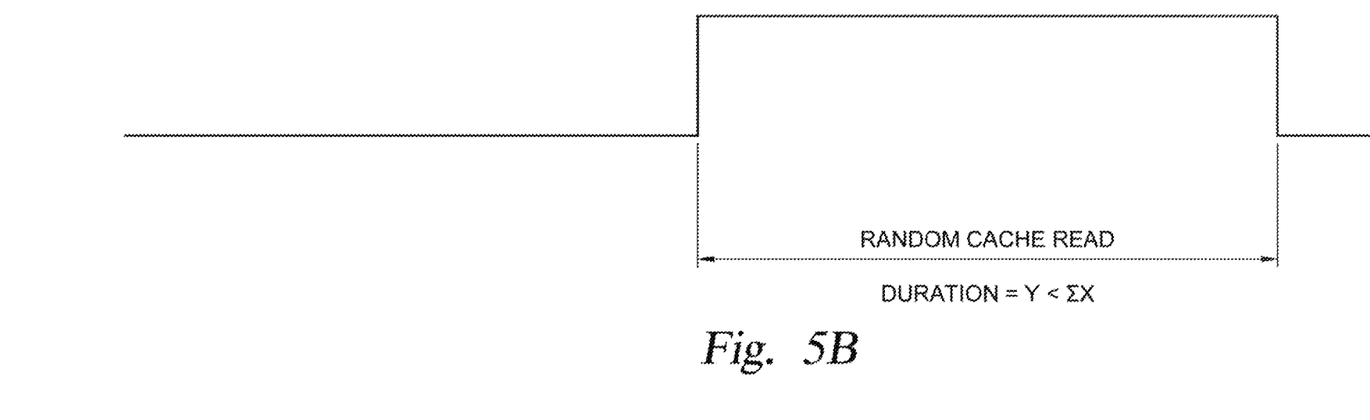
FIG. 5B is a schematic illustration of a duration to complete three operations bounded together in a burst operation of a particular flash memory die.

FIG. 5A is a schematic illustration of a duration to complete two separate random cache read operations and a page read operation of a particular flash memory die. The duration of three read operations in the sum of the durations of X1, X2, and X3. FIG. 5B is a schematic illustration of a duration to complete the same operations of FIG. 5A bounded together in a single random cache read operation of a particular flash memory die. The duration of the bounded single read operation or burst operation is shorter than the sum of the operations in FIG. 5A. The duration in FIG. 5B is shorter since the read access time of one page may be hidden or conducted in parallel during a sense phase or a transfer phase of another page. Binding a greater number of read requests to use the same random cache read operation increases the performance of the storage device. For example, a received read request may be bound to an open random cache read operation. In another example, an open random cache read operation can be maintained (i.e., not terminated) to allow for an incoming or predicted read request to be bound to the open random cache read operation.

FIG. 4 and FIG. 5B are examples of a random cache read operation. Any appropriate burst read operation may be utilized, such as binding together any number of read requests into a single operation.

Figures 6A, 6B, 6C:
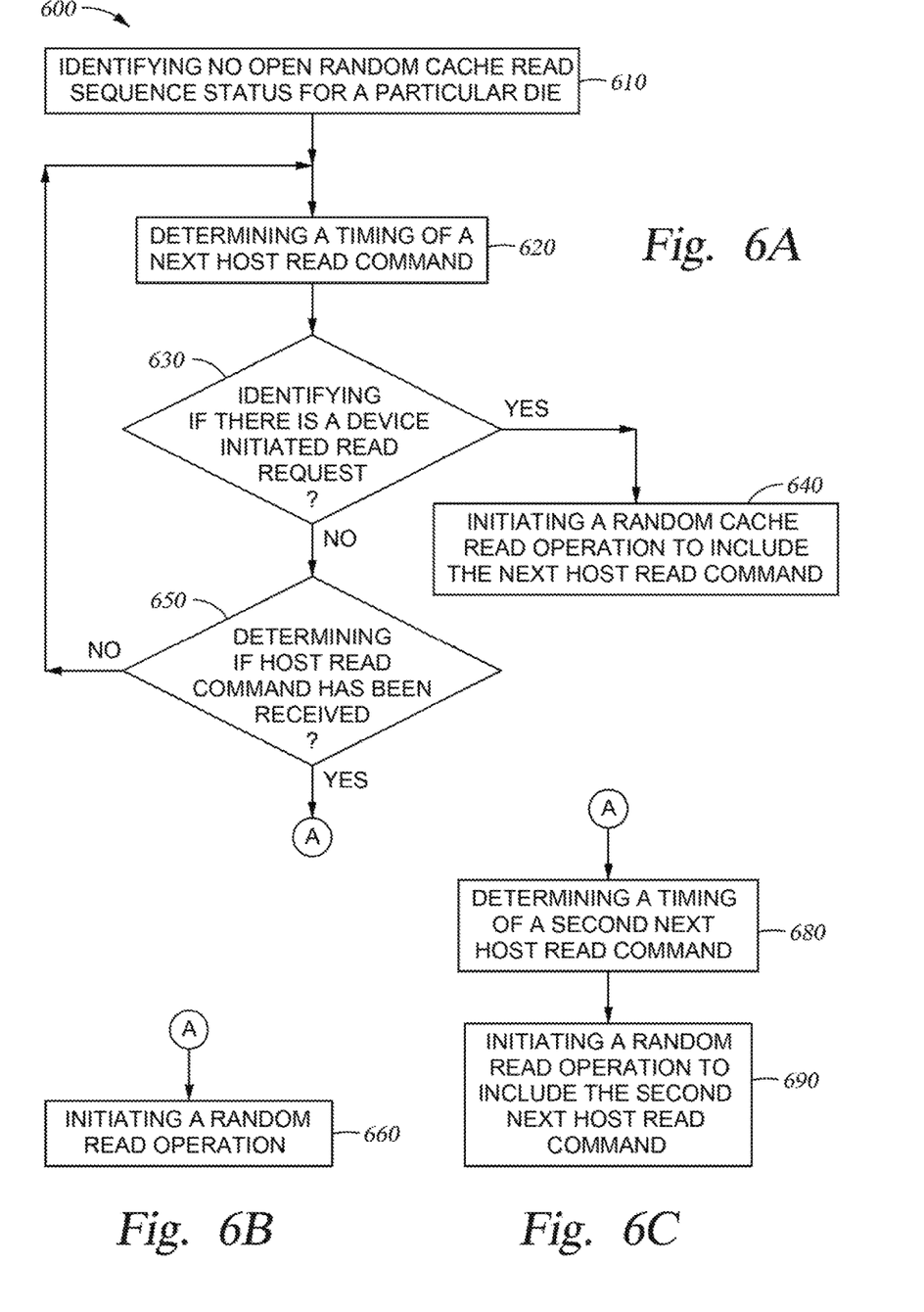
FIGS. 6A-6C are flowcharts illustrating embodiments of a method of initiating a random cache read sequence or a burst read operation for a particular flash die.

FIG. 6A is a flowchart illustrating one embodiment of a method 600 of initiating a random cache read sequence or a burst read operation for a particular flash die. Method 600 is described in reference to system 200 of FIG. 2 and FIG. 3, but other systems may be applicable. One or more blocks of method 600 may be performed by controller 210 executing computer-readable program code (e.g., software or firmware) executable instructions stored in storage device 202.

At block 610, controller 210 identifies a die of flash memory in which there is no open random cache read sequences being performed or identifies an idle die of flash memory. At block 620, controller 210 determines a timing of a next host read command to be received from host 250 for the particular flash memory die. The timing may be determined by host read command analyzer 220.

At block 630, controller 210 identifies if there is a read request initiated by storage device 202 to the particular flash memory die. Storage device initiated read requests may include read requests for garbage collection operations, read look ahead (RLA) operations, and other storage device 202 initiated read requests. Garbage collection operations may include moving or relocating valid data from pages to new blocks to free up the blocks with invalid data to become available for write operations. RLA operations may include pre-fetching data for sequential reads or for speculative reads.

At block 640, in response to identifying there is a storage device initiated read request, controller 210 initiates a random cache read operation or a burst read operation to the particular flash memory die. The initiated random cache read operation may include the next host read command. For example, controller 210 may initiate a random cache read operation starting with one or more storage device initiated read requests and then binding the next host read command into the open random cache read sequence. Depending on a timing determination of a next host read command, controller 110 may wait, such as a few microseconds, to initiate a random cache read operation so that the next host read command may be bound into an open sequence of the random cache read operation including one or more storage device initiated read requests.

At block 650, in response to determining there are no storage device initiated read requests, controller 210 determines if a host read command has been received for the particular flash memory die. If there is no received host read commands, method 600 may proceed back to block 620 to determine a timing of a next host read command or update a timing of a next host read command.

If there is a received host read command at block 650, method 600 may proceed to block 660 in one embodiment as shown in FIG. 6B or may proceed to block 680 in another embodiment as shown in FIG. 6C.

At block 660, controller 210 initiates a random cache read operation for the particular flash memory die. For example, multiple host read commands may have been determined to have been received at block 650. The multiple host read commands are bounded together in a single random cache read operation at block 660.

At block 680, controller 210 determines a timing of a second next host read command for the particular flash memory die. At block 690, controller 210 initiates a random cache read operation or a burst read operation to the particular flash memory die. The initiated random cache read operation includes the second next host read command. For example, controller 210 may initiate a random cache read operation starting with one or more received host read commands and then binding the second next host read command into the open random cache read sequence. Depending on a timing determination of the second next host read command, controller 210 may wait, such as a few microseconds, to initiate a random cache read operation so that the second next host read command may be bound into an open sequence of the random cache read operation including one or more received host read commands.

Figure 7:
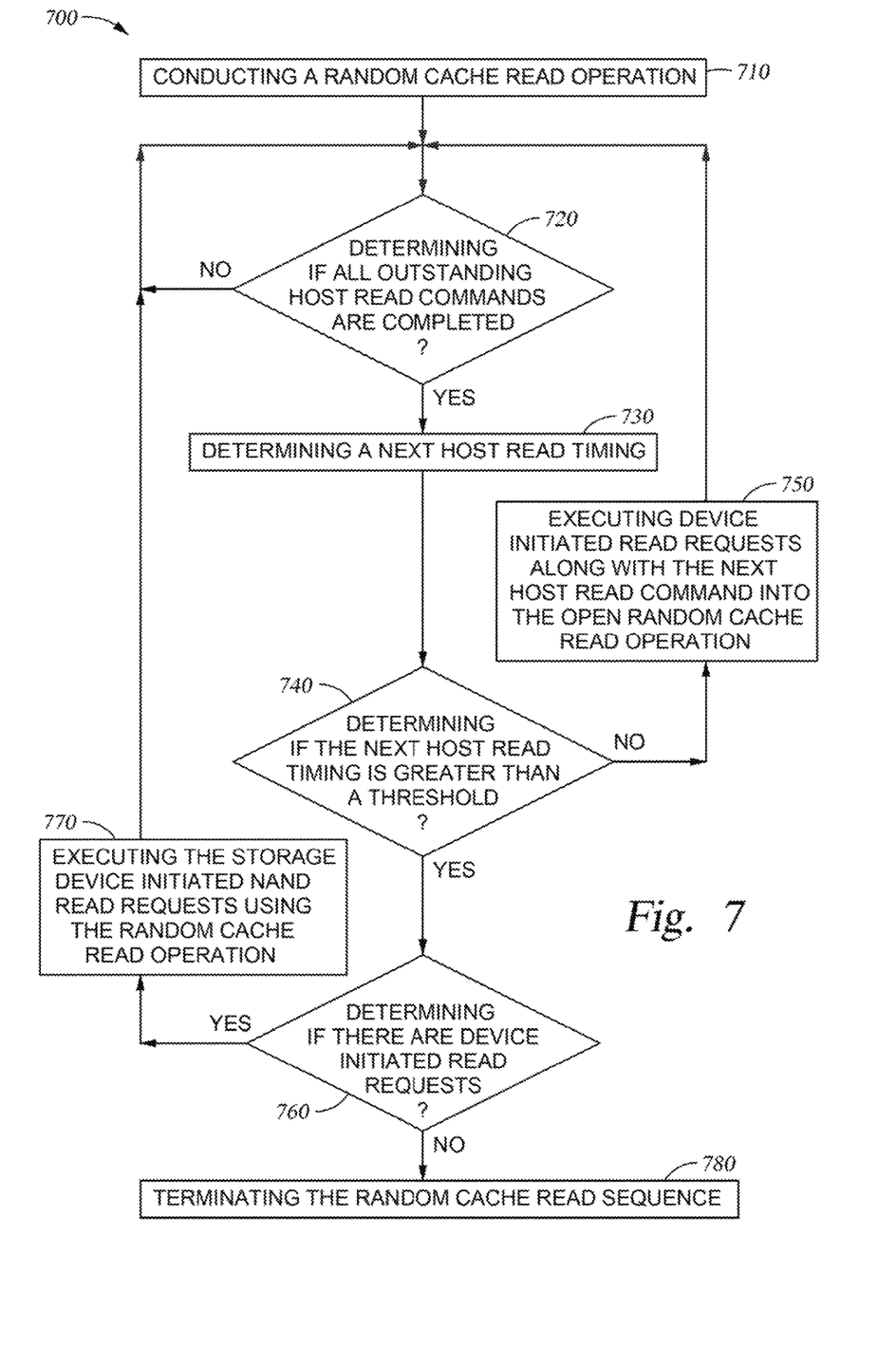
FIG. 7 is a flowchart illustrating one embodiment of a method of terminating a random cache read sequence or a burst read operation for a particular flash die.

FIG. 7 is a flowchart illustrating one embodiment of a method 700 of terminating a random cache read sequence or a burst read operation for a particular flash die. Method 700 is described in reference to system 200 of FIG. 2 and FIG. 3, but other systems may be applicable. One or more blocks of flowchart 700 may be performed by controller 210 executing computer-readable program code (e.g., software or firmware) executable instructions stored in storage device 202.

At block 710, a random cache read operation sequence is being conducted for a particular flash memory die. For example, a random cache read operation may be a random cache read operation from block 640 of method 600, a random cache read operation from block 660 of method 600, a random cache read from block 690 of method 600, any suitable random cache read operation, or any suitable burst read operation.

At block 720, controller 210 determines if all outstanding host read commands are completed or will be completed soon for the particular flash memory die. If all outstanding host read commands are completed or will be completed soon, controller 210 determines a timing of a next host read command for the particular flash memory die from host read command analyzer 220 at block 730. If all outstanding host read commands are not completed or will not be completed soon, controller 210 waits until all host read commands are completed or will be completed soon.

At block 740, controller 210 determines if the timing determined at block 730 is greater than a threshold. The threshold may be set by a user configuration or vendor setting.

At block 750, if the timing is not greater than the threshold, controller 210 executes one or more read requests initiated by storage device 202 using the open random cache read sequence of block 710 so that the next host read command may also be bound into the open random cache read sequence. For example, an open random cache read sequence is maintained by executing one or more storage device initiated read requests into the random cache read sequence until a next host read command is received or predicted to be received. Therefore, an open random cache read sequence is extended to accommodate a next host read command. After block 750, method 700 may proceed back to block 720.

At block 760, if the timing is greater than the threshold, controller 210 determines if there is any read request initiated by storage device 202. If there is not any storage device initiated read request, controller 210 may terminate the random cache read sequence at block 780.

If there is a storage device initiated read request, controller 210 executes one or more storage device initiated read requests at block 770 using the open random cache read sequence. Method 700 may proceeds back to block 720. Controller 210 at block 770 executes any storage device initiated read requests at block 770 into the open random cache read sequence prior to terminating the random cache read sequence.

Method 700 incorporates a timing of a next host read command to determine whether to terminate an open random cache read operation. In certain embodiments, when a next host read command is determined to be received soon (i.e., not greater than a threshold), the random cache read operation is maintained. In certain embodiments, when a next host read command is determined to be received after a long period of time (i.e., greater than a threshold), the random cache read operation is terminated. [006] In certain embodiments, a storage device may determine one or more attributes of a plurality of next host read commands for a particular memory die. In certain embodiments, a storage device may determine two or more attribute of a next host read command for a particular memory die.

In certain embodiments, a storage device and a method of accessing data stored in the storage device may include analyzing historical host reads commands to predict when a next host read command will be received by the storage device for a particular memory die. Utilizing the prediction, a random cache read sequence or a burst operation may be sustained so read data is accessed with reduced latency and reduced power consumption by the storage device. Storage device may use real-time attributes of received host read commands to increase the accuracy of a prediction of a next host read command based upon user behavior or storage device characteristics.

In certain embodiments, a storage device and a method of accessing data stored in the storage may include determining when to initiate a random cache read operation. In certain embodiments, a storage device and a method of accessing data storage in the storage may include determining when to terminate a random cache read operation.

In certain embodiments, a storage device and a method of accessing data stored in storage device may include selectively executing storage device initiated read requests so that one or more host read commands and one or more storage device initiated read requests may be bound together in single operation, such as a random cache read operation.

In certain embodiments, a storage device and method of access data stored in a storage device may be used in various scenarios. One example scenario includes use in memory systems with a low queue depth.

While the foregoing is directed to embodiments of the present disclosure, other and further embodiments of the disclosure may be devised without departing from the basic scope thereof, and the scope thereof is determined by the claims that follow.

What is claimed is:

1. A method of retrieving information stored in a storage device, comprising:
   determining a timing of a next host read command for a flash memory die;
   identifying if there is a storage device initiated read request for the flash memory die; and
   in response to an identification of the storage device initiated read request, initiating a random cache read operation with the storage device initiated read request bound with the next host read command.

2. The method of claim 1, wherein the random cache read operation is first initiated with the storage device initiated read request.

3. The method of claim 1, further comprising waiting to initiate the random cache read operation based upon the timing of the next host read command.

4. The method of claim 1, further comprising in response to no identification of the storage device initiated read request, receiving a host read command for the flash memory die.

5. The method of claim 4, further comprising initiating a second random cache read operation with the received host read command.

6. The method of claim 5, further comprising determining a timing of a second next host read command for the flash memory die and binding the second next host read command with the received host read command into the second random cache read operation.

7. The method of claim 6, further comprising waiting to initiate the second random cache read operation based upon the timing of the second next host read command.

8. A method of retrieving information stored in a storage device with an open cache read operation for a flash memory die, comprising:

determining a timing of completion of any outstanding read requests within the open cache read operation;
determining a timing of a next host read command for the flash memory die; and
executing the next host read command within the open cache read operation when the timing of the next host read command is not greater than a threshold.

9. A method of retrieving information stored in a storage device with an open cache read operation for a flash memory die, comprising:
determining a timing of completion of any outstanding read requests within the open cache read operation;
determining a timing of a next host read command for the flash memory die; and
executing the next host read command within a second open random cache read operation when the timing of the next host read command is greater than a threshold.

10. The method of claim 9, further comprising terminating the open cache read operation after a determination of the timing of the next host read command is greater than the threshold.

11. A method of retrieving information stored in a storage device with an open cache read operation for a flash memory die, comprising:
determining a timing of completion of any outstanding read requests within the open cache read operation;
determining a timing of a next host read command for the flash memory die;
executing the next host read command within the open random cache read operation when the timing of the next host read command is greater than a threshold; and
executing a storage device initiated read request for the flash memory die within the open random cache read operation and within the timing of the next host read command.

12. A method of retrieving information stored in a storage device with an open cache read operation for a flash memory die, comprising:
determining a timing of completion of any outstanding read requests within the open cache read operation;
determining a timing of a next host read command for the flash memory die; and
executing the next host read command,
wherein the open cache read operation is maintained by one or more storage device initiated read requests executed within the open cache read operation during the timing of the next host read command.

13. A storage device, comprising:
a plurality of flash memory dies;
a controller comprising a host read command analyzer; and
a flash interface coupling the controller and the plurality of flash memory dies,
wherein the controller is operable to:
determine a timing of a next host read command to a particular flash memory die of the plurality of flash memories dies; and
use the timing of the next host read command of the particular flash memory die to initiate a random cache read operation.

14. A storage device, comprising:
a plurality of flash memory dies;
a controller comprising a host read command analyzer; and
a flash interface coupling the controller and the plurality of flash memory dies,
wherein the controller is operable to:
determine a timing of a next host read command to a particular flash memory die of the plurality of flash memories dies; and
use the timing of the next host read command of the particular flash memory die to maintain an open random cache read operation.

15. The storage device of claim 14, wherein the timing is not greater than a threshold.

16. A storage device, comprising:
a plurality of flash memory dies;
a controller comprising a host read command analyzer; and
a flash interface coupling the controller and the plurality of flash memory dies,
wherein the controller is operable to:
determine a timing of a next host read command to a particular flash memory die of the plurality of flash memories dies; and
use the timing of the next host read command of the particular flash memory die to terminate a random cache read operation.

17. The storage device of claim 16, wherein the timing is greater than a threshold.

18. A storage device, comprising:
a flash memory die;
a controller means; and
a flash interface coupling the controller means and the flash memory die,
wherein the controller means is operable to maintain an open cache read operation by initiating one or more storage device initiated requests along with a plurality of random cache read sequences.

19. The storage device of claim 18, wherein the controller means comprises a host read command analyzer.

20. The storage device of claim 19, wherein the host read command analyzer of the controller means utilizes machine learning.

21. The storage device of claim 18, wherein the controller means is operable to determine one or more attributes of a particular next host read command to determine whether to terminate the open cache read operation.

22. The storage device of claim 21, wherein a timing of the particular next host read command is determined by the controller means.

* * * * *